Jan. 8, 1963
F. GAMBARDELLA
3,071,802
SHUCKING DEVICE FOR HARDSHELL FISH
Filed May 31, 1960
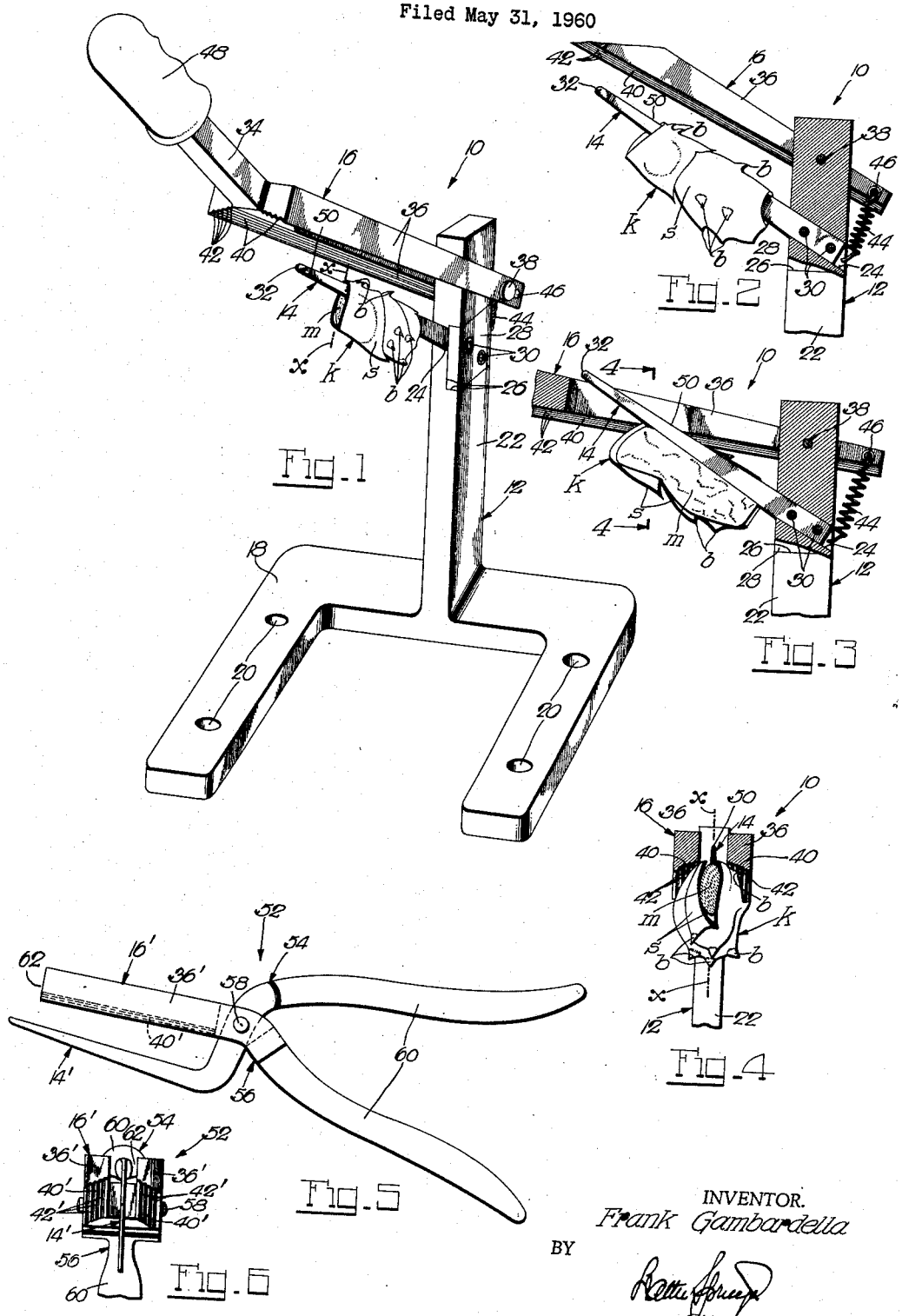
INVENTOR.
Frank Gambardella
BY
Attorney.

United States Patent Office 3,071,802
Patented Jan. 8, 1963

3,071,802
SHUCKING DEVICE FOR HARDSHELL FISH
Frank Gambardella, 48 Voss Road, West Haven, Conn.
Filed May 31, 1960, Ser. No. 32,796
6 Claims. (Cl. 17—7)

This invention relates generally to shucking tools for edible hardshell fish, and more particularly to a shucking tool for the knuckles of lobsters and hardshell crabs. While shucking the meat from most parts of lobsters and hardshell crabs is relatively easy and presents no real problem, it is quite different when it comes to their knuckle parts. Thus, these knuckle parts, hereinafter simply referred to as "knuckles," are in commercial outlets or restaurant establishments usually slit open lengthwise with a knife for the removal of the meat therefrom. Shucking knuckles in this fashion is a task which is not only awkward and unproductive, but hazardous as well, for it requires skill to even hold them firmly for slicing due to their unwieldy behaviour, and the hands of hired help performing this task are frequently bruised and cut by the knife or sharp barbs on the shells, or both. In consequence, the cost of shucking these knuckles by hired help is so high that most larger commercial outlets refrain from doing so and rather sell knuckles unshucked at inappreciable, if any, profit.

It is an object of the present invention to provide a tool for shucking knuckles rapidly and productively without requiring any skill on the part of an operator using it and without any bruising hazard to his or her hands, thereby to make the shucking of knuckles commercially well feasible not only for restaurant establishments but for the larger commercial outlets as well.

It is another object of the present invention to provide a tool of this type to which knuckles are applied by hand, in quick succession, and in an extremely simple fashion, and which shuck the applied knuckles on equally quick and simple manipulation of the tool, so that the production capacity of a single tool is so high as to meet the entire production requirements of a good many commercial establishments, and not many more of these tools will meet the production requirements of even the largest commercial outlets.

It is a further object of the present invention to provide a tool of this type which performs in the aforementioned highly productive fashion, yet will not bruise the shucked meat so that the same may be offered at the same price as costly lobster or crab meat.

Another object of the present invention is to provide a tool of this type which cracks, rather than slices, the hard shells of applied knuckles, thereby to eliminate any knife edge or edges with their potential hazard to an operator and also to assure entirely satisfactory performance of the tool for the longest time and with a minimum of maintenance.

It is a further object of the present invention to provide a tool of this type which is designed to accommodate, without any change or adjustment of any part thereof, knuckles of widely varying sizes with equal facility, thereby to lend to a single tool extremely wide utility.

It is another object of the present invention to provide a tool of this type which is of very simple and rugged construction, and which may be mass-produced at such low cost as to be purchasable even by home consumers of shucked lobster or crab meat at no more cost than that of many ordinarily used low-cost kitchen tools.

Other objects and advantages will appear to those skilled in the art from the following, considered in conjunction with the accompanying drawings.

In the accompanying drawings, in which certain modes of carrying out the present invention are shown for illustrative purposes:

FIG. 1 is a perspective view of a shucking device embodying the present invention;

FIG. 2 is a fragmentary longitudinal section through the same shucking device;

FIG. 3 is a section similar to FIG. 2, and showing the shucking device in a different operating position;

FIG. 4 is a section taken on the line 4—4 of FIG. 3;

FIG. 5 is a side view of a shucking device embodying the present invention in a modified manner; and FIG. 6 is a front view of the shucking device of FIG. 5.

Referring to the drawings, and more particularly to FIGS. 1 to 4 thereof, the reference numeral 10 designates a shucking device having a mounting bracket 12 and shucking elements 14 and 16. The mounting bracket 12 presently has a U-shaped base 18 with suitable holes 20 for its bolt attachment to a bench or other suitable support, and an upright post 22.

The shucking element 14 is in the form of a blade which is presently anchored to, and projects forwardly from, the bracket post 22. The rear end of the blade 14 is presently received in a fitting groove 24 in the bottom of a side recess 26 in the post 22, and is securely held therein by a retainer plate 28 which fits in the recess 26 and is screwed at 30 to the post 22. The forwardly projecting blade 14 is preferably planar and of relatively small thickness, and is preferably tapered in its plane leading to a smoothly rounded forward tip 32. The blade 14 is, for its designated function of cracking the hard shells $s$ of lobster or crab knuckles $k$ of widely varying sizes, made of a good grade of steel of adequate strength for the purpose and is also of adequate length easily to accommodate knuckles of all contemplated sizes. The cross-sectional dimensions in particular of the blade 14 are such as to leave in a knuckle $k$ thereon sufficient clearance for the meat $m$ therein to slither to either side of or below the blade without becoming bruised by the latter. For its application to the blade 14, a knuckle $k$ is simply slid endwise onto the blade from the tip end 32 thereof, with the meat in the knuckle dodging the blade on its projection into and through the knuckle. Preferably, knuckles are applied to the blade in the manner shown in the drawings, i.e., they are suspended on the blade in the direction of their characteristically longer axis $x$ (FIGS. 1 and 4).

The other shucking element 16 is in the form of a fork having a shank 34 and spaced prongs 36 which straddle the bracket post 22 and are near their ends pivoted to the latter as at 38, with the pivot axis extending perpendicular to the plane of the blade 14. The prongs 36 extend on opposite sides of and along, presently parallel to, the plane of the blade 14 and are spaced from the 36 are adapted to cooperate with the blade 14 in cracking apart the hard shell $s$ of a knuckle $k$ on the blade, and the prongs 36 have to this end cracking surfaces 40 which, preferably and advantageously, are inclined to each other and to the plane of the blade 14 so that they will straddle a knuckle on the blade in the wedge-like fashion shown in FIG. 4. Thus, the inclined prong surfaces 40 will, immediately on their wedge-like closure on a knuckle $k$ on the blade 14, firmly clamp the hard shell $s$ thereof against the latter and start to break the same, giving the knuckle no opportunity to twist on the blade despite the characteristic multi-curve contour of its shell. To further preclude twisting of a suspended knuckle $k$ on the blade and, instead, holding it firmly for immediate cracking of its shell $s$ on closure of the prong surfaces 40 thereon, the latter are preferably serrated, with the serrations 42 extending longitudinally of the prongs 36 and thereby affording not only narrowly spaced shell-gripping edges but also traps for barbs b on the shell which may be in the path of the serrated prong surfaces 40. The above-described preferred suspension of a knuckle on the blade 14 is thus firmly maintained on closure of the fork 16 thereon and during the cracking of the hard shell despite the multi-curve contour of the latter, so that the meat therein will not become bruised or squashed in any way.

The fork 36 is normally urged into the open position shown in FIGS. 1 and 2 by a return spring 44 which is anchored with its ends on the bracket post 22 and on a pin 46 in the end of the fork prongs 36. The shank 34 of the fork 16 serves as an advantageous lever arm for the operation of the latter, and is preesntly sheathed with a comfortable handle grip 48.

In operation, a knuckle k is slid onto the blade 14 in the described manner. This is a quick and simple task requiring no skill on the part of an operator, neither is the operator's hand likely to be bruised by sharp barbs on the knuckle for only the slightest hand pressure on the latter is sufficient for its quick application to the blade 14. The operator then merely depresses the fork 16 at the handle grip 48 in a quick stroke to close the prongs 36 on the hard shell of the suspended knuckle and crack the same apart throughout its length. FIG. 3 shows a shell s partly cracked apart, with the remainder of the shell being cracked apart on continued descent of the fork 16, as will be readily understood. In this connection, the blade 14 and fork 16 are preferably so arranged that they form at their passage angles with each other pointing away from the axis of the pivot connection 38, whereby a suspended hard shell s on the blade is in optimum controlled fashion and with the least effort on the part of the operator cracked progressively from one end to the other on closure of the fork 16. After the shell is completely cracked apart along the side thereof adjacent the blade 14 and then usually drops from the latter with the meat still contained in the shell, the operator releases the fork 16 for spring-return to its open position and slides the same shell onto the blade 14 in suspension therefrom which is the reverse of its previous suspension therefrom. The operator then again depresses the fork 16 for cracking the suspended shell apart, and the latter is this time divided into separate parts from which the meat is readily separated. This overall process in shucking a knuckle may be repeated in quick succession on other knuckles, as will be readily understood.

The present shucking device 10 is thus highly efficient in its performance and has a large production capacity, yet its construction is extremely simple and rugged and it lends itself to efficient mass production at very low cost. The present shucking device 10 is also quite safe in even quick operation, for it lacks any sharp cutting edges and is hand-operated. In this connection, the knuckle-backing edge 50 of the blade 14, as well as the other edges thereof, are preferably dull, which not only eliminates cutting hazards to an operator's hand but also makes for entirely satisfactory performance of the device for the longest time and with the least maintenance.

While the described mountable shucking device 10 is particularly appropriate for commercial establishments dealing in hardshell fish, a hand shucking tool 52 embodying the same invention and being particularly useful in smaller restaurants and in homes is shown in FIGS. 5 and 6. This tool comprises two members 54 and 56 which are pivotably connected at 58. The members 54 and 56 provide on opposite sides of their pivot 58 blade and fork elements 14', 16' and handles 60, of which the elements 14' and 16' may be like the respective blade 14 and fork 16 of the described device 10, except that the fork 16' is open at its forward end 62. Thus, the fork 16' has prongs 36' with shell-cracking surfaces 40' which are inclined to each other and to the plane of the blade 14' so as wedge-like to straddle a knuckle on the blade. Also, the cracking surfaces 40' of the prongs 36' are longitudinally serrated as at 42'. The present hand shucking tool 52 is used in the same way as the shucking device 10 in cracking the hard shells of knuckles, the only difference being that the handles 60 are closed by hand pressure for the shucking performance of the present tool. The present tool has also all the advantages of the shucking device 10, except that it is not mounted like the latter but, instead, may be put away when not in use and will also cost less than the mounted device.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. A shucking device for hardshell knuckles and the like, comprising two members relatively turnable about an axis, of which one member provides a blade with a free end and a substantially straight side edge extending from said end over a distance greater than the length of a knuckle, with said blade extending widthwise in a plane substantially normal to said axis and being over said distance thereof of sufficiently narrow width for endwise slide-on of a knuckle into suspension therefrom substantially with clearance from the meat therein, and the other member provides substantially parallel prongs extending on opposite sides of and along said plane and being in confronting and substantially equally spaced relation with said blade edge when said blade and prongs are open, with said prongs being spaced from each other and of a length to pass said blade edge with clearance therefrom over the entire extent of a knuckle thereon for cracking its hard shell on closing said blade and prongs; and lever means for opening and closing said blade and prongs.

2. A shucking device as set forth in claim 1, in which said prongs are substantially straight.

3. A shucking device as set forth in claim 1, in which said blade is tapered in said plane with its width progressively increasing away from said free end thereof.

4. A shucking device as set forth in claim 1, in which all exposed edges of said blade are dull.

5. A shucking device as set forth in claim 1, in which said prongs have shell-cracking surfaces inclined to each other and said plane for their wedge-like straddling of a knuckle on the blade when closing said blade and prongs.

6. A shucking device as set forth in claim 1, in which said blade and prongs are coordinated so that on passing each other they define angles pointing away from said axis.

References Cited in the file of this patent

UNITED STATES PATENTS

| | | |
|---|---|---|
| 708,014 | Blagden | Sept. 2, 1902 |
| 1,598,490 | Miller | Aug. 31, 1926 |
| 2,237,203 | Swanson | Apr. 1, 1941 |
| 2,747,220 | Thompson | May 29, 1956 |